US007108461B1

(12) United States Patent
Colburn et al.

(10) Patent No.: US 7,108,461 B1
(45) Date of Patent: Sep. 19, 2006

(54) CLAMP WITH MAGNETIC SPINDLE POSITIONER

(75) Inventors: Bill D. Colburn, Arlington, WA (US); Robert W. Allard, Everett, WA (US); Robert D. Dixon, Everett, WA (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 11/089,084

(22) Filed: Mar. 24, 2005

(51) Int. Cl.
*B23C 9/00* (2006.01)

(52) U.S. Cl. ........................ 409/131; 409/225; 269/95; 269/8; 269/74; 269/276

(58) Field of Classification Search ................ 409/189, 409/197, 205, 218–220, 225, 131–132; 269/95, 269/8, 71, 74, 91, 276
See application file for complete search history.

(56) References Cited

U.S. PATENT DOCUMENTS 1,801,222 A * 4/1931 Cayo .......................... 409/241
1,828,791 A * 10/1931 Thompson ..................... 269/8
2,349,087 A * 5/1944 Hartley ....................... 409/225
3,382,742 A * 5/1968 Gibbs .......................... 269/91
3,614,909 A * 10/1971 Neuser ....................... 409/218
4,140,308 A * 2/1979 Disston et al. ............. 269/87.3
4,335,873 A * 6/1982 Kiefer ........................ 269/228
4,353,167 A * 10/1982 Martin ........................ 33/770
4,407,493 A 10/1983 Okolischan
5,924,685 A * 7/1999 Webb ......................... 269/228
6,361,034 B1 * 3/2002 Wolfe ............................ 269/8

* cited by examiner

*Primary Examiner*—Erica Cadugan
(74) *Attorney, Agent, or Firm*—Klein, O'Neill & Singh, LLP; Tejinder Singh

(57) ABSTRACT

A clamping apparatus includes a clamp arm that is pivotable between a raised position and a lowered position, and a clamp spindle assembly that is adjustably positionable along the length of the arm. A magnet in the clamp spindle assembly magnetically engages the clamp arm with sufficient magnetic force to maintain the spindle assembly in a selected position as the clamp arm is moved between its raised and lowered positions, while allowing the position of the clamp spindle assembly to be manually adjusted.

14 Claims, 2 Drawing Sheets

CLAMP WITH MAGNETIC SPINDLE POSITIONER

CROSS-REFERENCE TO RELATED APPLICATION

Not Applicable

FEDERALLY-SPONSORED RESEARCH OR DEVELOPMENT

Not Applicable

BACKGROUND OF THE INVENTION

This invention relates to clamping devices for holding a workpiece during assembly or manufacture. More specifically, it relates to an adjustable clamp having a locking clamp spindle that is adjustably positionable in a clamping arm, wherein the spindle can be maintained in a desired position in the arm by means of a permanent magnet fixed to the spindle.

Clamps for holding workpieces typically include a clamping spindle that is installed in a pivotable clamp arm and that is adjustably positionable along the length of the clamp arm. The spindle is held in a desired position by means of spindle locking nuts or similar fasteners. To adjust the position of the spindle on the clamp arm, the nuts or fasteners are loosened, and the spindle is re-positioned. Movement of the clamp arm between its raised and lowered positions while the nuts or fasteners are loose can result in the spindle shifting from its desired position. Thus, adjustment of the spindle position to accommodate workpieces of differing shapes and thicknesses requires constant attention to assure that there is no shifting of the spindle when the clamp arm is moved before the spindle locking nuts are tightened. Even with the exercise of such caution, some inadvertent shifting frequently occurs, with resultant inconsistency of results.

It would therefore be an advantage over the prior art to provide a clamp spindle positioning mechanism that allows the adjustment of the spindle position on the clamp arm, while maintaining a set position as the clamp arm is rotated between its raised and lowered positions.

SUMMARY OF THE INVENTION

Broadly, the present invention is a clamping apparatus, of the type having a clamp arm that is pivotable between a raised position and a lowered position, and a clamp spindle assembly that is adjustably positionable along the length of the arm, wherein the improvement comprises a magnet in the clamp spindle assembly that magnetically engages the clamp arm with sufficient magnetic force to maintain the spindle assembly in a selected position as the clamp arm is moved between its raised and lowered positions, while allowing the position of the clamp spindle assembly to be manually adjusted.

More specifically, the spindle assembly includes a threaded spindle that is threaded through a non-magnetic metal (preferably aluminum) block. Attached to the bottom end of the spindle is a clamp foot, and attached to the top end of the spindle is an actuation knob or handle for loosening or tightening the clamp foot against a workpiece as the knob or handle is turned, thereby threading the spindle into or out of the block, depending on the rotational direction. A permanent magnet is installed in a recess in the side wall of the block. The clamping arm comprises a hollow tube of magnetizable metal (e.g., steel), preferable of rectangular cross section, with an open first end and a second end that is pivotably attached to a clamping bracket for movement between the raised and lowered positions. The arm includes a longitudinal slot in each of its top and bottom walls. The interior of the arm defines a channel that is dimensioned to receive the block of the clamping assembly, and the longitudinal slots are dimensioned to allow the spindle to pass through both slots when the block is installed in the arm channel.

The block is installed in the arm channel through the open arm end, and then the spindle is threaded into the block through the slot in the top wall of the clamp arm. When the bottom end of the spindle emerges through the slot in the bottom wall of the arm, the clamp foot is threaded onto the spindle. The magnet in the block is situated so that its is closely proximate one of the side walls of the arm, whereby the magnetic field established between the magnet and the arm maintains the block (and thus the spindle threaded through it) in any selected position, even while the clamp arm is rotated between its raised and lowered positions. If a new position of the spindle is desired, it can be moved manually within the arm channel without the need to loosen any nuts or fasteners.

It will be appreciated that the clamping apparatus of the present invention provides a much simpler means for adjusting the spindle position, without the need for locking nuts or fasteners, whereby the chances for spindle shifting or slippage during arm movement are substantially reduced if not eliminated.

DETAILED DESCRIPTION OF THE INVENTION

Figure 1:
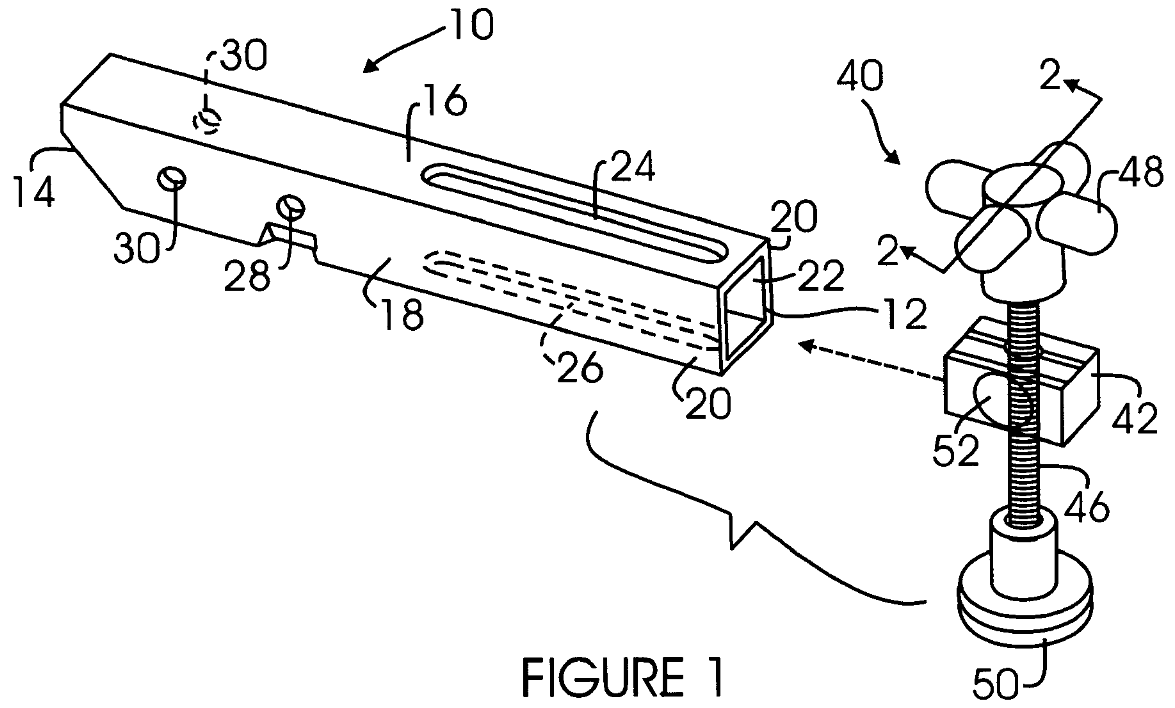
FIG. 1 is an exploded perspective view of a clamp arm and spindle assembly of the type used in the improved clamping apparatus in accordance with the present invention.
Figure 2:
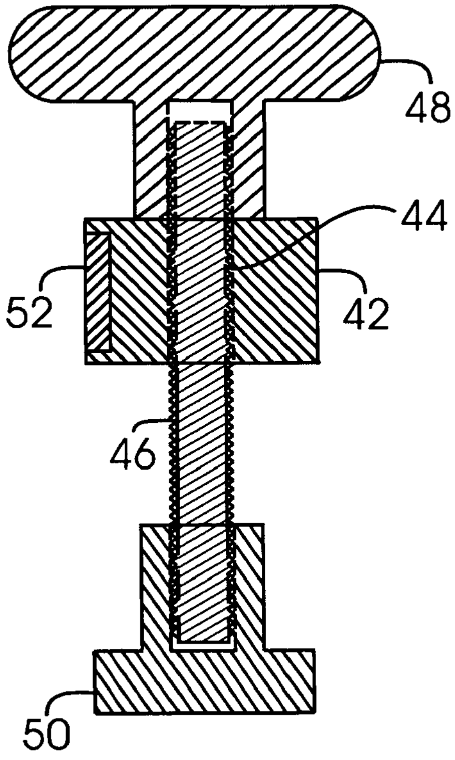
FIG. 2 is a cross-sectional view taken along line 2—2 of FIG. 1.

Referring now to the drawings, FIGS. 1 and 2 illustrate a clamp arm 10 and a clamp spindle assembly 40, of the type used in an improved clamping apparatus 100 (FIG. 3) in accordance with the present invention. The arm 10 comprises a hollow tube of a magnetizable (i.e., ferrous) metal (preferably a suitable structural steel) having an open first or clamping end 12 and second or pivoting end 14 that may be closed or open. The arm is preferably rectangular in cross-section, with a top wall 16, a bottom wall 18, and side walls 20 that define a rectangular interior channel 22. A first longitudinal slot 24 is formed in the top wall 16, and a second longitudinal slot 26, in registry with the first slot 24, is formed in the bottom wall 18. The arm 10 may also be provided with a locking pin aperture 28 in one of the side walls 20, and a registered pair of pivot pin apertures 30 in the side walls 20, near the second end 14 of the arm 10.

The clamp spindle assembly 40 is mounted for longitudinal movement in the clamp arm 10. The clamp spindle assembly 40 comprises a spindle block 42 having a threaded bore or passage 44 through its vertical dimension, and a spindle 46 threaded through the bore 44. The block 42 is preferably made of a machinable metal, such as aluminum, or it may be made of any suitable metallic or non-metallic material. The spindle 46, comprising a threaded rod that is threaded through the threaded bore 44, has an upper end that protrudes through the top of the block 42, and on which is threaded a handle or knob 48. A lower end of the spindle 46 protrudes through the bottom of the block 44, and a clamp foot 50 is threaded onto the lower end of the spindle 46. The diameter of the spindle 46 is slightly smaller than the widths of the slots 24, 26 in the arm 10, so that the spindle 46 can be slidably received in the slots 24, 26, as described below.

The block 42 has a recess in one side in which a permanent magnet 52 is fixed (as by a suitable adhesive). The magnet 52 is preferably made of an Nd—Fe alloy, such as NdFeB, but any suitable magnetic alloy may be used. The surface of the magnet 52 is preferably flush with the adjacent surface of the block 42. The block 42 is dimensioned so that it slidably fits in the channel 22 of the arm 10, with the exterior surfaces of the block 42 advantageously being in a slidable frictional fit against the interior wall surfaces of the channel 22. Thus, the external dimensions of the block 42 are preferably just slightly smaller than the internal dimensions of the channel 22.

The spindle assembly 40 may be installed in the arm 10 as follows: The block 42 is inserted into the channel 22 through the open end 12. The block 42 is oriented so that the magnet 52 is adjacent one of the side walls 20 of the arm 10, and the threaded passage 44 is aligned with the slots 24, 26. The spindle 46 is threaded into the threaded passage 44 through the upper slot 24, preferable after the knob 48 has been threaded onto the upper end of the spindle 46. the spindle 46 is threaded through the block 42 until the lower end of the spindle 46 emerges through the bottom of the block 42 and the lower slot 26, after which the clamp foot 50 may be threaded onto the lower end of the spindle 46.

Figure 3:
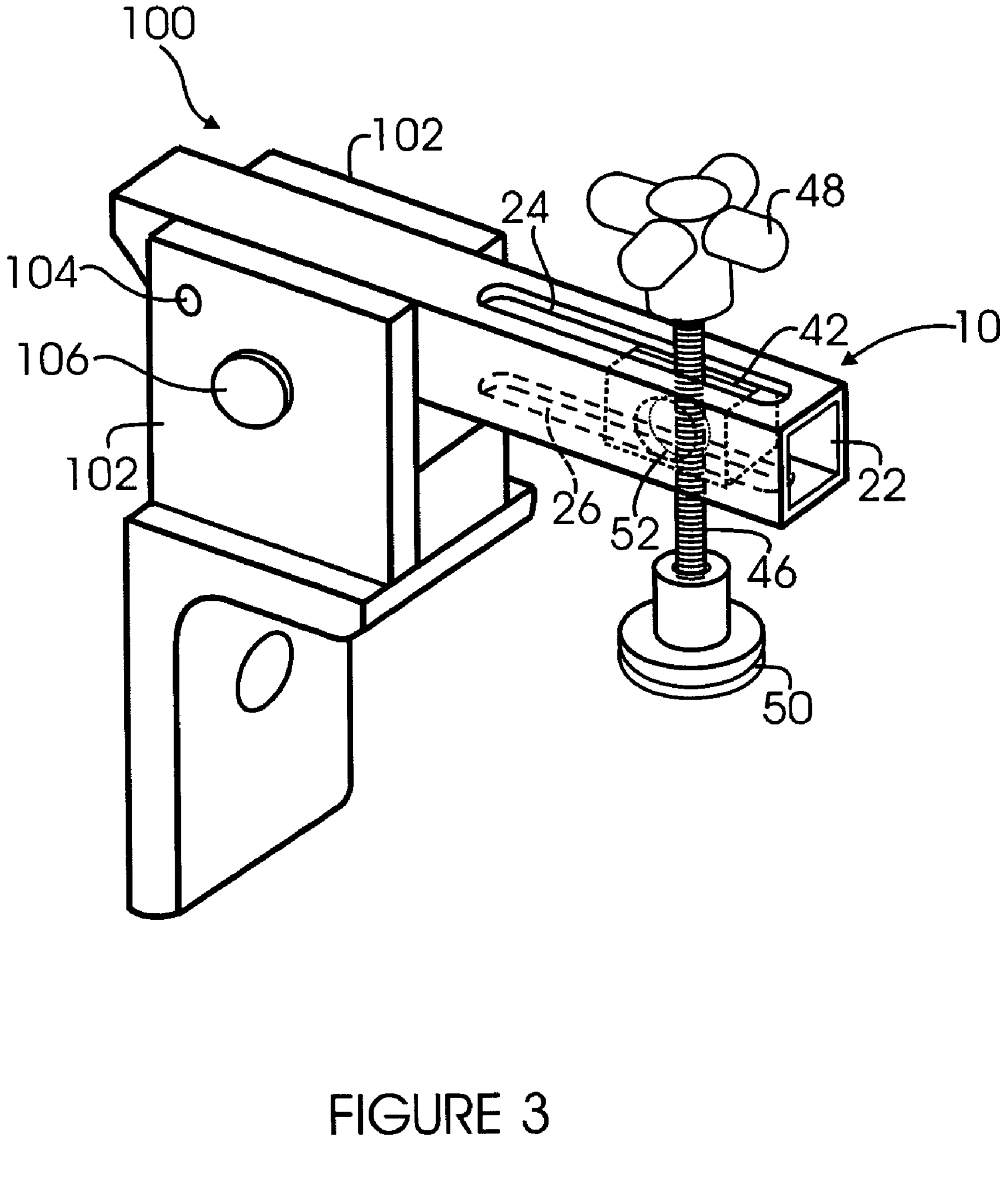
FIG. 3 is a perspective view, partially in phantom, of an improved clamp in accordance with the present invention.

FIG. 3 shows the clamping apparatus 100 with the clamp arm 10 attached. Specifically, the second end 14 of the clamp arm 10 is pivotably attached to a clamp bracket 102 by means of a pivot pin 104 inserted through registering pivot pin journal holes (not shown) in opposite sides of the bracket 102, and through the pivot pin journal apertures 30 in the arm 10 which are alignable with the journal holes in the bracket 102. The arm 10 thus may be pivoted between a raised position and a lowered position, the latter being shown in FIG. 3. The arm 10 may be locked into its lowered position by means of a conventional spring-loaded locking pin (not shown), which engages the locking pin aperture 28 in the arm 10 through a registering aperture in one side of the bracket 102. The locking pin may be disengaged from the locking pin aperture 28 by means of a locking pin knob 106.

In use, the longitudinal position of the spindle assembly 40 in the arm 10 is adjusted by manually moving the spindle assembly 40 longitudinally to a selected position between the ends of the slots 24, 26. Once a longitudinal position is selected, the magnetic force created between the magnet 52 and the adjacent side wall 20 of the arm 10 will maintain the spindle assembly 40 in that selected position until the spindle assembly 40 is manually moved to another position, even if the clamp arm 10 is pivoted between its lowered and raised positions.

Although a preferred embodiment of the invention has been described above, it will be appreciated that a number of variations and modifications may suggest themselves to those skilled in the pertinent arts. For example, the configuration and location of the magnet 52 described herein are exemplary only. Also, it may be advantageous, in certain applications, to have a pair of magnets, one on each side of the block 42, rather than the single magnet shown in the drawings. Indeed, more than one magnet may be provided on each side of the block. These and other variations and modifications that may suggest themselves should be considered to be within the spirit and scope of the invention, as defined in the claims that follow.

What is claimed is:

1. An improved clamping apparatus, of the type including a clamp arm that is pivotable between a raised position and a lowered position, and a clamp spindle assembly that is adjustably positionable along the length of the arm, wherein the improvement comprises:

a magnet in the clamp spindle assembly that magnetically engages the clamp arm with sufficient magnetic force to maintain the clamp spindle assembly in a selected position as the clamp arm is moved between its raised and lowered positions, while allowing the position of the clamp spindle assembly to be manually adjusted.

2. The improved clamping apparatus of claim 1, wherein the clamp arm comprises a hollow tube of ferrous metal having upper and lower longitudinal slots, and wherein the spindle assembly comprises:

a spindle block dimensioned to fit slidably in the interior of the tube, wherein the magnet is disposed in the block so as to establish a magnetic engagement with the tube when the block is disposed in the interior of the tube; and a spindle threaded through the block, the spindle being dimensioned to pass through the upper and lower longitudinal slots when the block is disposed in the interior of the tube.

3. The improved clamping apparatus of claim 2, wherein the block has a surface with a recess, and wherein the magnet is seated in the recess so as to be substantially flush with the adjacent surface of the block.

4. The improved clamping apparatus of claim 1, wherein the magnet is made of a neodymium-iron alloy.

5. The improved clamping apparatus of claim 4, wherein the magnet is made of neodymium-iron-boron alloy.

6. A clamping apparatus, comprising:

a clamp arm pivotable between a raised position and a lowered position, the clamp arm comprising a hollow tube of ferrous metal having a pivoting end and an open end, and upper and lower longitudinal slots; and a clamp spindle assembly, comprising:

a spindle block dimensioned to fit slidably into the tube through the open end;

a spindle threaded through the spindle block and dimensioned and located so as to pass through the upper and lower slots in the tube of the clamp arm; and a magnet disposed in the spindle block so as to engage magnetically the tube of the clamp arm when the spindle block is situated in the tube with sufficient magnetic force to maintain the clamp spindle assembly in a selected position as the clamp arm is moved between its raised and lowered positions, while allowing the position of the clamp spindle assembly to be manually adjusted.

7. The clamping apparatus of claim 6, wherein the block has a surface with a recess, and wherein the magnet is seated in the recess so as to be substantially flush with the adjacent surface of the block.

8. The apparatus of claim 6, wherein the magnet is made of a neodymium-iron alloy.

9. The clamping apparatus of claim 8, wherein the magnet is made of neodymium-iron-boron alloy.

10. In a clamping apparatus having a clamp arm that is pivotable between a raised position and a lowered position, and a clamp spindle assembly that is mounted for longitudinal movement in the clamp arm, a method of maintaining the longitudinal position of the clamp spindle assembly in the clamp arm as the clamp arm is pivoted between the raised position and the lowered position, comprising the step of magnetically engaging the spindle assembly with the clamp arm with sufficient magnetic force to maintain the clamp spindle assembly in a selected longitudinal position as the clamp arm is moved between its raised and lowered positions, while allowing the longitudinal position of the clamp spindle assembly to be manually adjusted.

11. The method of claim 10, wherein the clamp arm comprises a hollow tube of ferrous metal having upper and lower longitudinal slots, and wherein the spindle assembly comprises:

a spindle block dimensioned to fit slidably in the interior of the tube;

a magnet disposed in the block so as to establish a magnetic engagement with the tube when the block is disposed in the interior of the tube; and a spindle threaded through the block, the spindle being dimensioned to pass through the upper and lower longitudinal slots when the block is disposed in the interior of the tube.

12. The method of claim 11, wherein the block has a surface with a recess, and wherein the magnet is seated in the recess so as to be substantially flush with the adjacent surface of the block.

13. The method of claim 11, wherein the magnet is made of a neodymium-iron alloy.

14. The method of claim 13, wherein the magnet is made of neodymium-iron-boron alloy.

* * * * *